(12) United States Patent
Schultz

(10) Patent No.: US 6,208,988 B1
(45) Date of Patent: Mar. 27, 2001

(54) METHOD FOR IDENTIFYING THEMES ASSOCIATED WITH A SEARCH QUERY USING METADATA AND FOR ORGANIZING DOCUMENTS RESPONSIVE TO THE SEARCH QUERY IN ACCORDANCE WITH THE THEMES

(75) Inventor: John Michael Schultz, Bala Cynwyd, PA (US)

(73) Assignee: Bigchalk.com, Inc., Wilmington, DE (US)

( * ) Notice: Subject to any disclaimer, the term of this patent is extended or adjusted under 35 U.S.C. 154(b) by 0 days.

(21) Appl. No.: 09/088,188

(22) Filed: Jun. 1, 1998

(51) Int. Cl.$^7$ .................................................... G06F 17/21
(52) U.S. Cl. ................................ 707/5; 707/3; 707/100; 707/500
(58) Field of Search .................................. 707/3, 5, 6, 7, 707/100, 508, 513, 515, 500

(56) References Cited

U.S. PATENT DOCUMENTS

| | | | | |
|---|---|---|---|---|
| 5,642,502 | * | 6/1997 | Driscoll ..................................... | 707/5 |
| 5,826,260 | * | 10/1998 | Byrd, Jr. et al. .......................... | 707/5 |
| 5,870,740 | * | 2/1999 | Rose et al. ................................ | 707/5 |
| 5,915,249 | * | 6/1999 | Spencer ..................................... | 707/5 |
| 5,983,216 | * | 11/1999 | Kirsch et al. ............................. | 707/2 |
| 6,006,225 | * | 12/1999 | Bowman et al. ......................... | 707/5 |
| 6,012,053 | * | 1/2000 | Pant et al. ................................. | 707/3 |

OTHER PUBLICATIONS

Mitchell, et al., "Case Study: fishing for information on the Internet", Information Visualization, IEEE Comput, Soc. Press, 1995, abstract Only.*

Biswas, et al. "A knowledge based system approach to document retrieval", 2nd Conf. on artificial Intelligence applications: The Engineering knowledge-Based Systems, 1985, Abstract Only.*

* cited by examiner

Primary Examiner—Jean R. Homere
(74) Attorney, Agent, or Firm—Kenyon & Kenyon (57) ABSTRACT

A method of identifying at least one query theme associated with a search query, wherein the query theme corresponds to a subject, person or place associated with the search query. A document record archive has a plurality of document records each of which is associated with a stored document. Each of the document records has a plurality of metadata fields each of which stores a numerical score representing a degree of correlation between the stored document associated with the document record and a document theme, wherein the document theme corresponds to a subject, person or place associated with the stored document. A results list is retrieved in response to the search query, the results list is formed of document records each of which is associated with the search query. A composite theme score is determined for each document theme represented by the metadata fields in the document records in the results list. Each of the plurality of composite theme scores is compared to a threshold. Each composite theme score that exceeds the threshold is identified as a major theme score, and the document theme associated with the major theme score is selected as a query theme associated with the search query.

10 Claims, 11 Drawing Sheets

| DOCUMENT HEADER | |
|---|---|
| SUBJECT #1 | CONFIDENCE SCORE (1-100) |
| SUBJECT #2 | CONFIDENCE SCORE (1-100) |
| SUBJECT #3 | CONFIDENCE SCORE (1-100) |
| SUBJECT #4 | CONFIDENCE SCORE (1-100) |
| SUBJECT #5 | CONFIDENCE SCORE (1-100) |
| ⋮ | ⋮ |
| PERSON #1 | COUNT |
| PERSON #2 | COUNT |
| PERSON #3 | COUNT |
| PERSON #4 | COUNT |
| PERSON #5 | COUNT |
| PERSON #6 | COUNT |
| ⋮ | ⋮ |
| PLACE #1 | COUNT |
| PLACE #2 | COUNT |
| PLACE #3 | COUNT |
| PLACE #4 | COUNT |
| PLACE #5 | COUNT |
| PLACE #6 | COUNT |
| PLACE #7 | COUNT |

METHOD FOR IDENTIFYING THEMES ASSOCIATED WITH A SEARCH QUERY USING METADATA AND FOR ORGANIZING DOCUMENTS RESPONSIVE TO THE SEARCH QUERY IN ACCORDANCE WITH THE THEMES

FIELD OF THE INVENTION

The present invention is directed to systems for identifying documents corresponding to a search topic or query, and for identifying themes such as persons, places or subjects corresponding to the search topic or query. In addition, the present invention is directed to an automated system for identifying and retrieving text and multi-media files related to a search topic from a database library, and for organizing the text and multi-media files related to the search topic for a user in accordance with the themes associated with the search topic.

BACKGROUND OF THE INVENTION

Information retrieval systems are designed to store and retrieve information provided by publishers covering different subjects. Both static information, such as works of literature and reference books, and dynamic information, such as newspapers and periodicals, are stored in these systems. Information retrieval engines are provided within prior art information retrieval systems in order to receive search queries from users and perform searches through the stored information. It is an object of most information retrieval systems to provide the user with all stored information relevant to the query. However, many existing searching/retrieval systems are not adapted to identify the best or most relevant information yielded by the query search. Such systems typically return query results to the user in such a way that the user must retrieve and view every document returned by the query in order to determine which document(s) is/are most relevant. It is therefore desirable to have a document searching system which not only returns a list of relevant information to the user based on a query search, but also returns the information to the user in such a form that the user can readily identify which information returned from the search is most relevant to the query topic.

SUMMARY OF THE INVENTION

The present invention is directed to a method of identifying at least one query theme associated with a search query, wherein the query theme corresponds to a subject, person or place associated with the search query. A document record archive has a plurality of document records each of which is associated with a stored document. Each of the document records has a plurality of metadata fields each of which stores a numerical score representing a degree of correlation between the stored document associated with the document record and a document theme, wherein the document theme corresponds to a subject, person or place associated with the stored document. A results list is retrieved in response to the search query, the results list is formed of document records each of which is associated with the search query. A composite theme score is determined for each document theme represented by the metadata fields in the document records in the results list. Each of the plurality of composite theme scores is compared to a threshold. Each composite theme score that exceeds the threshold is identified as a major theme score, and the document theme associated with the major theme score is selected as a query theme associated with the search query.

BRIEF DESCRIPTION OF THE DRAWINGS

In order that the manner in which the above-recited and other advantages and objects of the invention are obtained and can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention and the presently understood best mode thereof will be described and explained with additional specificity and detail through the use of the accompanying drawings.

DETAILED DESCRIPTION OF THE INVENTION

Figure 1:
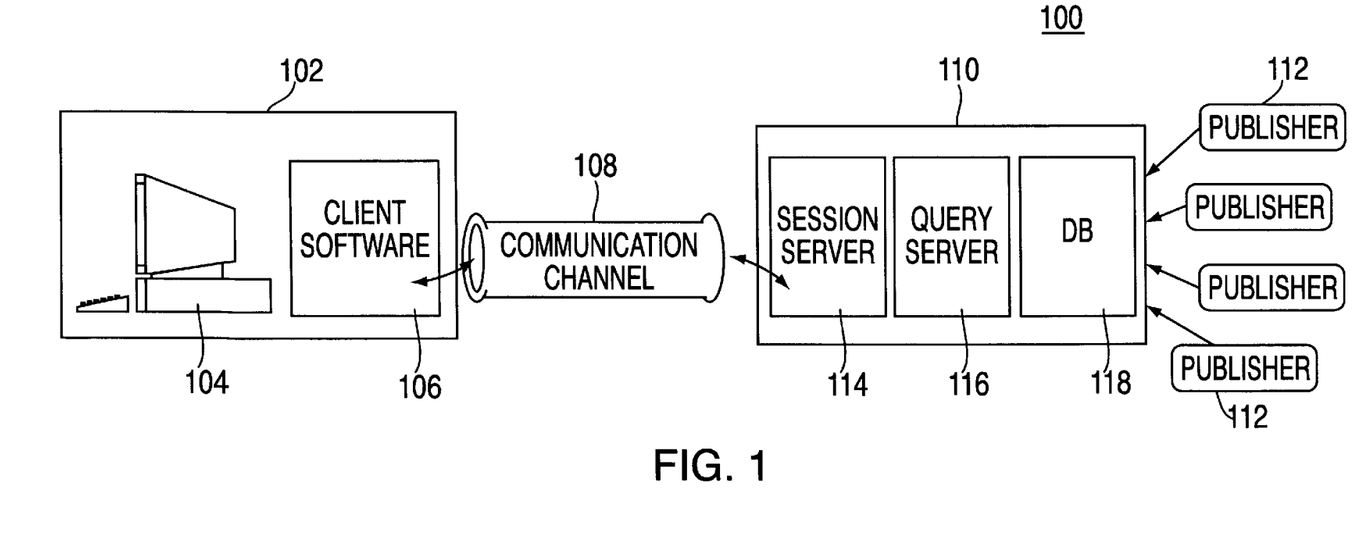
FIG. 1 is a simplified block diagram showing an information retrieval system in accordance with a preferred embodiment of the present invention.

Referring now to FIG. 1, there is shown a simplified block diagram illustrating an information retrieval system 100, in accordance with a preferred embodiment of th(present invention. The information retrieval system 100 includes a user station 102 for searching information files which have been collected from various publisher sources 112 and stored in data center 110. The user station 102 includes a personal computer (PC) 104 and user software 106 which resides on PC 104. User software 106 includes a graphical user interface. The user station 102 provides search queries by way of a communications channel 108 (such as, for example, a large volume public network or the Internet) coupled to the data center 110. The data center 110 includes session server 114 which includes means for receiving a search query from user station 102, means for sending the search query to a query server 116, means for receiving search results information from the query server 116, means for processing metadata associated with the search results information in order to identify one or more major themes present in the search results information, means for sending a list of the identified major themes across communications channel 108 to the user station 102, means for receiving a request from user station 102 over communications channel 108 to review document records associated with a selected major theme, means for sending a search results list representative of the search results information associated with the selected major theme across communications channel 108 to the user station 102, means for receiving a document retrieval request transmitted from user station 102 over communications channel 108 to session server 114, and means for retrieving a document from database 118 in response to the retrieval request and transmitting a file representative of the document to user station 102 over communications channel 108. The query server 116 at data center 110 includes means for receiving a search query from the session server 114, searching means for searching a document index database 117 (shown in FIG. 3) to identify documents responsive to the search query, and means for sending search results information representative of the documents identified by the searching means from the query server 116 to the session server 114. Data center 110 also includes a library database 118 for storing text, image, audio or other multi-media information representative of files provided by a plurality of publishers 112. As explained more fully below, session server 114 retrieves (from library 118) documents identified by a search query and selected by a user of user station 102 for retrieval, and then transmits the selected documents to the user station 102 over channel 108.

Figure 2:
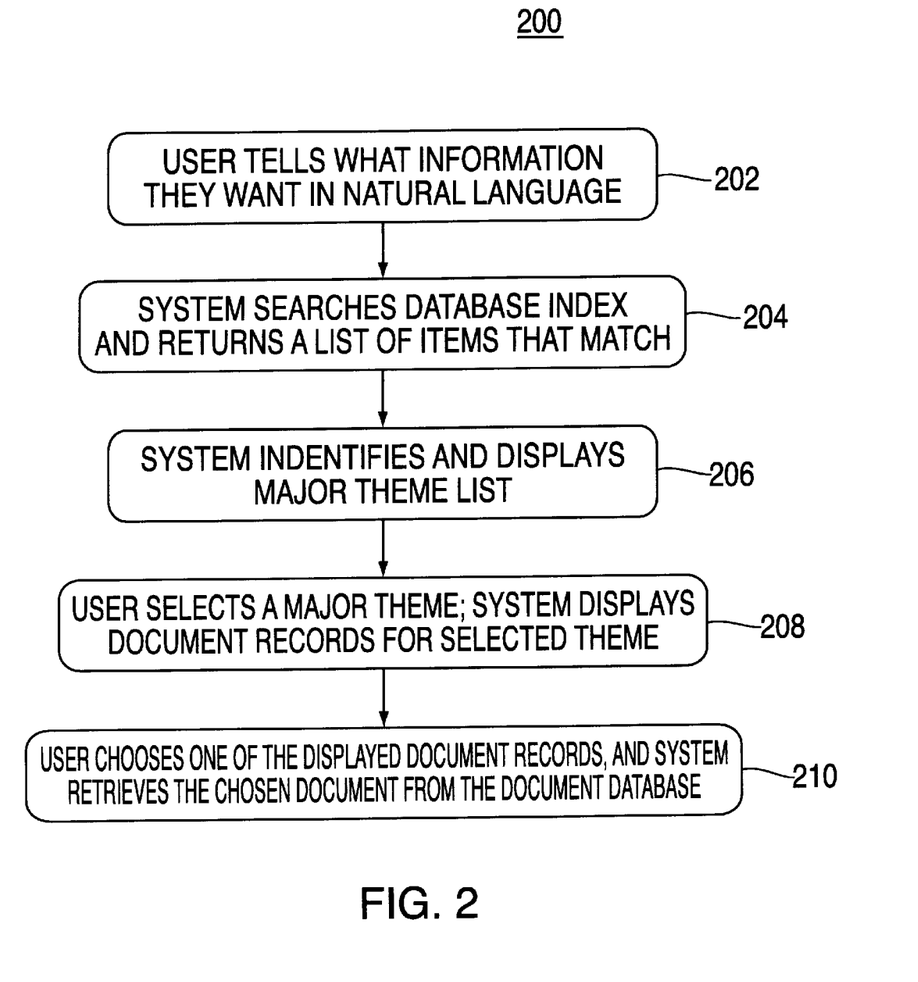
FIG. 2 is a simplified process flow diagram illustrating a user session which may be performed with the information retrieval system shown in FIG. 1, in accordance with a preferred embodiment of the present invention.

Referring now to FIG. 2, there is shown a simplified process flow diagram illustrating a user session 200 which may be performed with information retrieval system 100 shown in FIG. 1, in accordance with a preferred embodiment of the present invention. In step 202 of user session 200, the user station 102 communicates to data center 110 (via channel 108) a description of the information that a user of user station 102 would like to identify at data center 110. More specifically, in step 202 the a user of user station 102 sends a "natural language search query" to data center 110. As described more fully below, the term "natural language search query" is used to refer to a question, sentence, sentence fragment, single word or term which describes (in natural language form) a particular topic or issue for which a user of user station 102 seeks to identify information. Based on the natural language query provided by user station 102, the query server 116 in data center 110 searches a document index database 117 coupled to the query server, and returns a list of document records responsive to the search query, as shown in step 204. As shown in more detail in FIG. 4C, each of the document records returned by the query server in step 204 will have a plurality of metadata fields associated therewith. For a given document record, the metadata fields associated with the document record store numerical scores representing the degree of correlation between the document associated with the document record and particular subject(s), person(s) and/or place(s). Next, in step 206, the session server 114 processes the information in the metadata fields in the document records returned in step 204, and, based on this metadata information, the session server 114 identifies one or more major themes associated with the document records returned in step 204. Each of the major themes corresponds to a particular subject, person or place associated with the original natural language query submitted by the user in step 202. The major themes identified by the session server in step 206 are then transmitted to the user station 102 in ranked order over communications channel 108, and then displayed on the screen of user station 102. Next, in step 208, the user selects one of the major themes displayed on user station 102 by, for example, clicking on a word or symbol associated with a major theme on the display of user station 102. In response to the selection of a displayed major theme by the user, session server 114 selects document records from the search results list returned in step 204 that have metadata information that correlates (above a given threshold) with the major theme selected by the user, and a list of these selected document records (with metadata information that correlates with the selected theme) is then returned to the user via communications channel 108 and displayed for the user on the screen of user station 102. Next, in step 210, the user may select for retrieval a document associated with one of the document records displayed for the user in step 208. In step 210, session server 114 in data center 110 retrieves the full text, image, audio or other multi-media information associated with a selected file from the library database 118.

Detailed Overview of System Operation

Figure 3:
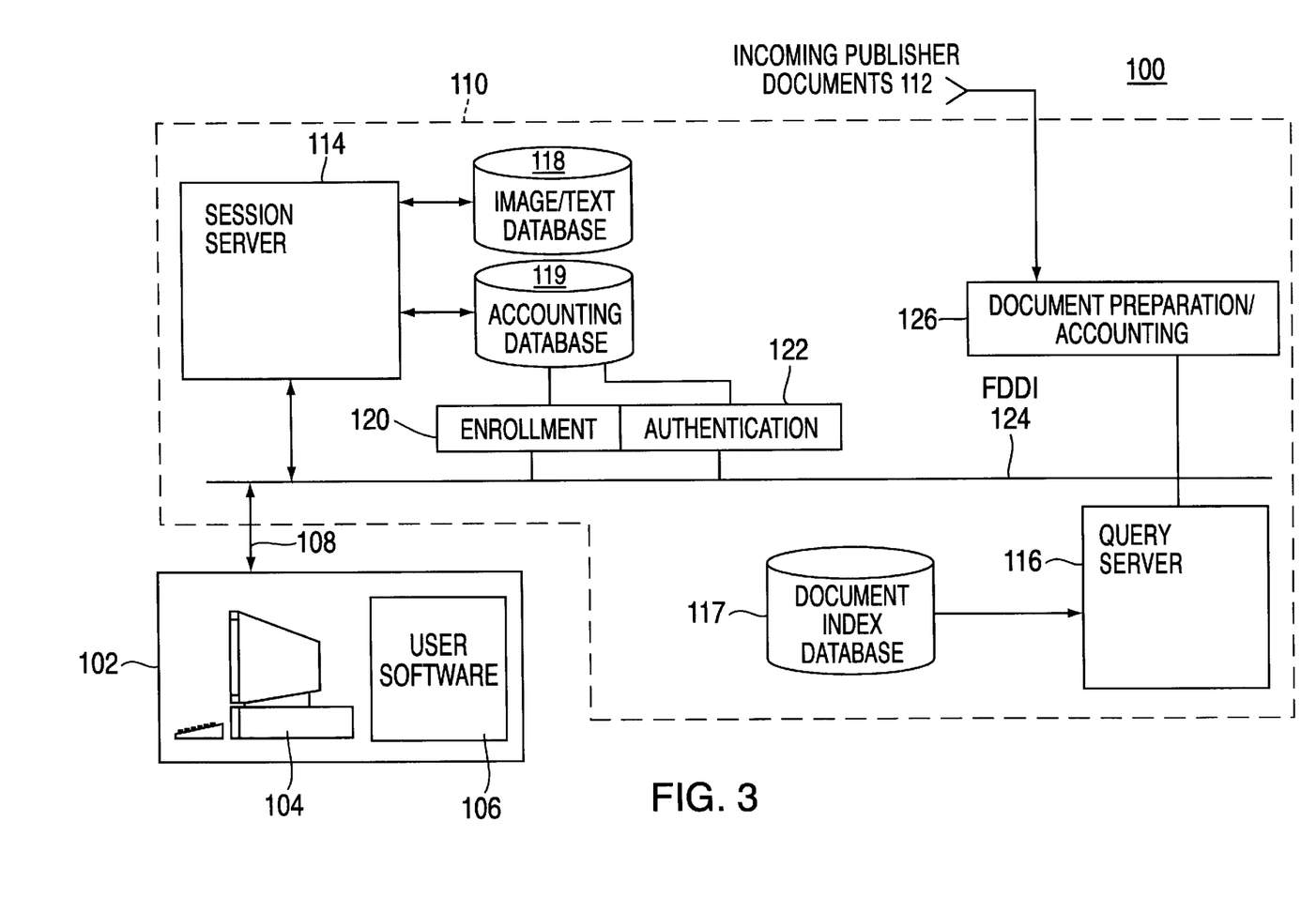
FIG. 3 is a more detailed block diagram showing an information retrieval system in accordance with a preferred embodiment of the present invention.

Referring now to FIG. 3, there is shown a more detailed block diagram showing the overall operation of information retrieval system 100, in accordance with a preferred embodiment of the present invention. The information retrieval system shown in FIG. 3 is a more detailed representation of the information retrieval system 100 shown in FIG. 1. As shown in FIG. 3, data center 110 includes image/text database 118 for storing document files representative of each of the publisher documents 112 received in data center 110. The image/text database 118 is coupled to session server 114 which, as explained more fully below, uses image/text database 118 to retrieve the full text/image of individual documents selected by user station 102 during a user session. An accounting database 119 is also coupled to session server 114. The accounting database 119 is used to store royalty and marketing information generated during operation of system 100. A document index database 117 is coupled to query server 116. The document index database 117 contains a list of search terms corresponding to potential search terms which may appear in a search query. For each search term listed in the document index database 117, document index database 117 stores the document identification number corresponding to each document file (stored in image/text database 118) that includes that search term, along with location information corresponding to the location of the search term in each such document file. Although in the preferred embodiment of the present invention, database 118 stores document files representative of textual documents, still digital video images, motion digital video sequences, and digital audio sequences, it will be understood by those skilled in the art that any other type of multi-media object file, such as, for example, multi-media object files containing graphical images, may also be stored on database 118.

Figure 6:
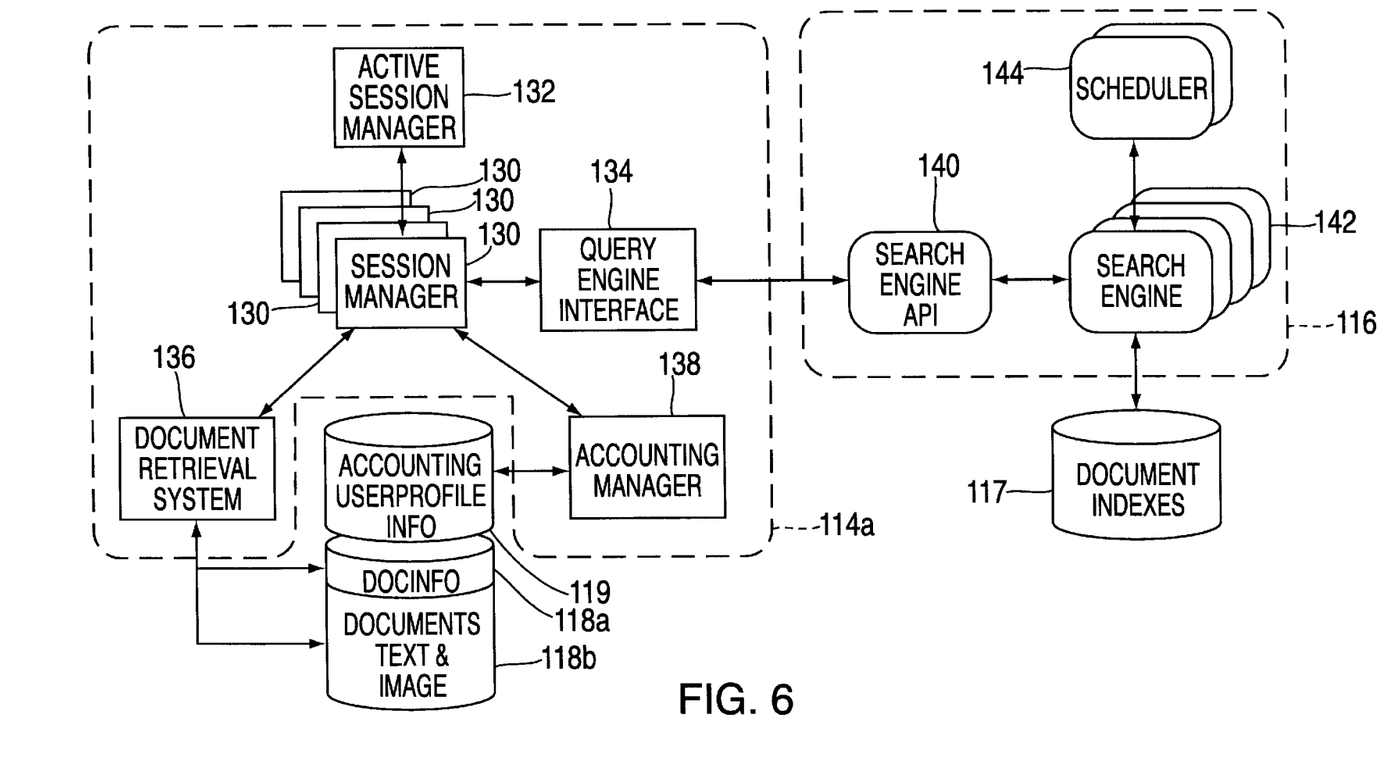
FIG. 6 is a block diagram illustrating the operation of software systems for implementing the session and query managers shown in FIGS. 4, 4A, in accordance with a preferred embodiment of the present invention.

Responsibility for executing the tasks associated with receiving queries from user station 102, processing and performing searches based on such queries, returning the results of the queries to user station 102, processing metadata associated with the search results information in order to identify one or more major themes present in the search results information, sending a list of the identified major themes to the user, receiving a user request to review document records associated with a selected major theme, sending a search results list representative of the search results information associated with the selected major theme to the user, receiving a document retrieval request transmitted from the user, retrieving a document from database 118 in response to the retrieval request and transmitting a file representative of the document to user station 102 over communications channel 108, are divided between session server 114 and query server 116, which are connected to each other and to channel 108 by Fiber Distributed Data Interface (FDDI) 124. For purposes of the present application, the term "server", when used in conjunction with "session" or "query", is used to refer to a physical machine formed from at least one computer processor having associated memory and software installed thereon for executing the functions to be performed by the server. In the preferred embodiment of the present invention, the hardware platform used for implementing session server 114 consists of a Tandem® 4412 computer having 2 processors, 256 MB of memory, a 2 GB system disk, and a 2 GB RAID disk; a flow diagram illustrating the operation of a preferred software system 114a for implementing session server 114 on this hardware platform is shown in FIG. 6 and discussed in connection with FIGS. 4, 4A, 4B and 6A below. In the preferred embodiment of the present invention, the hardware platform used for implementing query server 116 consists of a Tandem® 4412 computer having 2 processors, 1 GB of memory, a 2 GB system disk, and a 8 GB RAID disk; the operation of a preferred software system 116a for implementing query server 116 on this hardware platform is discussed below. Although specific hardware is disclosed herein for implementing session server 114 and query server 116, it will be understood by those skilled in the art that other suitable hardware platforms may alternatively be used to implement servers 114, 116. However, the two Tandem® hardware systems described above for implementing servers 114, 116 are preferred because these systems allow servers 114, 116 to be hardware-scalable. This "hardware scalability" allows data center 110 to handle an increasing number of user stations 102 simply by adding further processors to the existing hardware used for servers 114, 116, without modification of the software running on such hardware.

In addition to managing the search and flow of information during a user session, the session manager 114 attends to various accounting and subscriber services. The information required for performing the accounting and subscriber services is stored in a separate accounting database 119. In performing these operations, session manager 114 functions in conjunction with enrollment means 120 and authentication means 122 which are also coupled to accounting database 119. As described more fully below in conjunction with FIG. 4, enrollment means 120 functions to initiate new (first time) users into data center 110. Enrollment means 120 "enrolls" each new user into data center 110 by causing subscriber information representing the new user to be entered into accounting database 119. On subsequent accesses to data center 110 by a previously enrolled user, authentication means 122 determines that the user is already enrolled in the data center 110 by accessing records stored within the accounting database 119.

Data preparation within the document preparation/accounting means 126 of data center 110 includes means for document filtering, document loading and indexing of new documents received by the data center 110 from a plurality of document publishers 112. Documents received from a publisher 112 are in a publisher-specific format. In the filtering step of the document preparation process, a document received from a publisher 112 is Converted to a universal publisher processing format. The universal publisher processing format is a single format used by data center 110 for storing and retrieving all documents received from various publishers 112.

Figure 4:
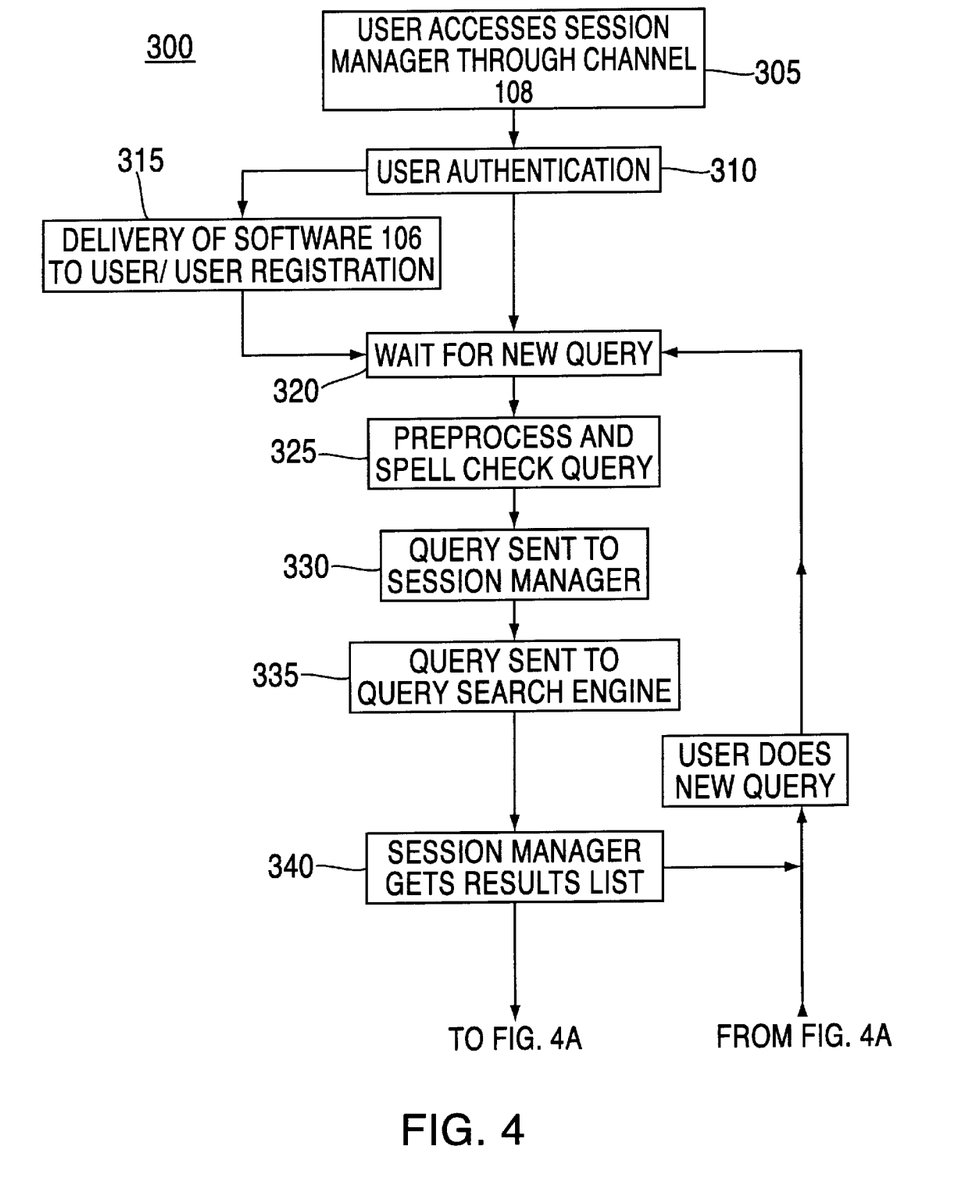
FIGS. 4 and 4A are a more detailed process flow diagram illustrating a user session which may be performed with the information retrieval system shown in FIG. 3, in accordance with a preferred embodiment of the present invention.
Figure 4A:
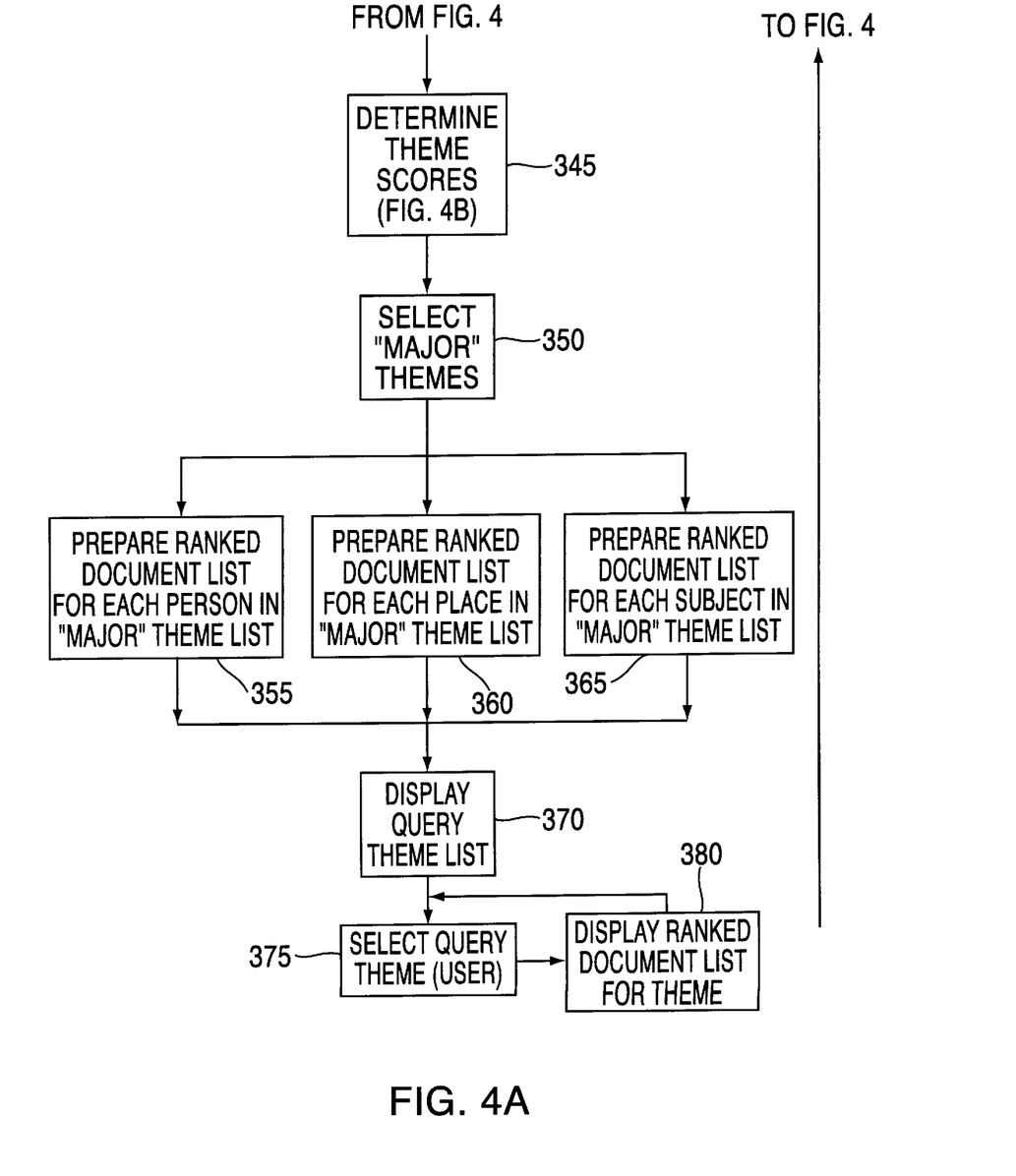

Referring now to FIGS. 4, 4A, there is shown a process flow diagram illustrating the steps in an exemplary user session 300 which may be performed using the information retrieval system 100 shown in FIG. 3, in accordance with a preferred embodiment of the present invention. Initially, in step 305, a user station 102 accesses the data center 110 by establishing a communications link over communications channel 108 between PC 104 and FDDI 124 within data center 110. As explained above, communications channel 108 may consist of a communications link formed over a public network such as the Internet. Alternatively, communications channel 108 may consist of a communications link formed between PC 104 and FDDI 124 over a commercial network. Thus, commercial networks such as, for example, the Prodigy® network, the CompuServe® network, or the Microsoft® network, may be used to establish a communications channel 108 for linking PC 104 and FDDI 124. Once this communications link is established, processing proceeds to step 310, where the authentication means 122 attempts to authenticate the user of user station 102. More particularly, based on information input by the user, authentication means 122 determines whether the user is authentic, i.e, whether the user is authorized to access data center 110. If the user is authentic, but has not used accessed data center 110 previously, processing proceeds to step 315, where enrollment means 120 optionally downloads a copy of software system 106 onto PC 104, and optionally executes software 106. In addition, in step 315 the enrollment means 120 requests the user to provide personal "enrollment information" about him/herself such as, for example, the user's full name, address, grade level, gender, occupation, the occupations of the user's parents, the numbers of brothers and/or sisters of the user, the type of computer used by the user, the user's modem speed, the display capabilities of the user's display, the size of the memory of the user's PC, and the identity of the communications link (es, the Internet, the Prodigy® network, the CompuServe® network, or the Microsoft® network) used for accessing the system. Each new user enrolled by enrollment means 120 is assigned a unique user identification number. The enrollment (or subscriber) information received by enrollment means 120 is stored in accounting database 119 together with the user identification number corresponding to the new user in the form of individual records corresponding to each enrolled user. In the embodiment shown in FIG. 3, enrollment means 120 and authentication means 122 are implemented in software on a separate machine which is physically distinct from the processor(s) used for implementing session server 114. In an alternative embodiment (not shown), enrollment means 120 and authentication means 122 may be implemented in software as part of session server 114. In this alternative embodiment, enrollment means 120 and authentication means 122 may be implemented on the same processor(s) used for implementing session server 114.

Referring still to FIGS. 4, 4A, following steps 310, 315, processing proceeds to step 320, where software 106 on PC 104 waits for the user to input a search query. The search query represents a topic, issue or question about which the user desires to locate information. In the preferred embodiment, the search query is provided by the user in a natural language format. Thus, for example, if the user wants to locate relevant sources of information indicating how many soldiers were killed in Vietnam, the user might enter the query, "How many soldiers were killed in Vietnam." The query may be entered in the form of a complete sentence, or as phrase or sentence fragment, such as, "Vietnam casualties". In an alternate embodiment, the query may be entered by the user in a non-natural language format wherein the user identifies one or more key words to be searched, whether the key words should be searched conjunctively or disjunctively, and, for key words to be searched conjunctively, the distance between which the key words must fall relative to one and other to come within the scope of the search.

Following the inputting of the search query, processing proceeds to step 325 where software system 106 spell checks the search query. The purpose of spell checking the search query prior to sending the query to data center 110 is to prevent the wasting of resources at data center 110 that would likely result if data center 110 attempted to process a search query with a spelling error. After the search query has been spell checked, processing proceeds to step 330, where the spell checked search query is transmitted by PC 104 over communications channel 108 to session server 114.

Upon receipt of the query by session server 114, processing proceeds to step 335, during which the search query is transmitted from the session server 114 to the query server 116 which processes the search query. More particularly, in this step, query server 116 scans its document index database 117 based on the user's search query in order to identify document identification numbers representing textual documents and multi-media files relevant to the search query.

The document index database 117 searched by query server 116 contains a list of search terms corresponding to potential search terms which may appear in or be related to words or terms in a search query. For each search term listed in the document index database 117, document index database 117 stores the document identification number corresponding to each document file (stored in database 118) that includes that search term, along with location information corresponding to the location of the search term in each such document file. Further details regarding the structure and operation of document index database 117 are shown in FIG. 5B and discussed later in this specification.

The term "document file" is used in the present application to mean a file in database 118 which stores either a textual document or, alternatively, a file which stores a multimedia record such as, for example, a still image, a sequence of motion digital video frames, or a sequence of digital audio frames. In contrast to files solely representing textual documents, each multi-media file in database 118 is stored along with a separate portion of text related to the multi-media record (referred to below as the "associated text field" or "image text-type information field" corresponding to each such multi-media file). This associated text field is used as the basis for generating document index information (for storage on document index database 117) corresponding to each multi-media file stored in database 118. More particularly, for each search term listed in the document index database 117, document index database 117 stores the document identification number corresponding to each multi-media file having an associated text field which includes that search term, along with location information corresponding to the location of the search term in the associated text field. In view of the fact that document index database 117 stores index information for both textual document files and multi-media files, the scan of document index database 117 by query server 116 in step 335 simultaneously identifies document identification numbers representing both textual documents and multi-media records relevant to the search query. In a preferred embodiment of the present invention, the associated text or image text-type information field associated with a multi-media record such as, for example, a still image, may consist of a caption, article or other text which a publisher 112 may have published in connection with the still image.

The identification numbers of the textual documents and multi-media files identified during the search are then used by the query server 116 to form a search results list which contains entries having the document identification number of document records corresponding to each textual document and multi-media file identified in the search. The document index searching operations performed by query server 116 are preferably implemented in part using commercially available searching software such as the Conquest™ search engine program marketed by Excalibur™ Technologies. In step 340, following the generation of the search result list by query server 116, the search result list is transmitted from query server 116 to session server 114.

Next, in steps 345 and 350, the session server 114 processes the document records in the search results list in order to identify at least one query theme associated with the search query input in step 320. The query theme will correspond to a subject, person or place associated with the search query. As explained more fully below in connection with FIG. 4C, each of the document records 400 stored in database 118*a* (and appearing on the search results list) has a plurality of metadata fields each of which stores a numerical score representing a degree of correlation between the stored document associated with the document record 400 and a document theme, wherein the document theme corresponds to a subject, person or place associated with the stored document. In step 345, the session server 114 uses the information stored in the metadata fields of the records in the search results list in order to determine a plurality of composite theme scores. In particular, in this step the session server determines a composite theme score for each document theme represented by the metadata fields in the document records in the results list.

Figure 4B:
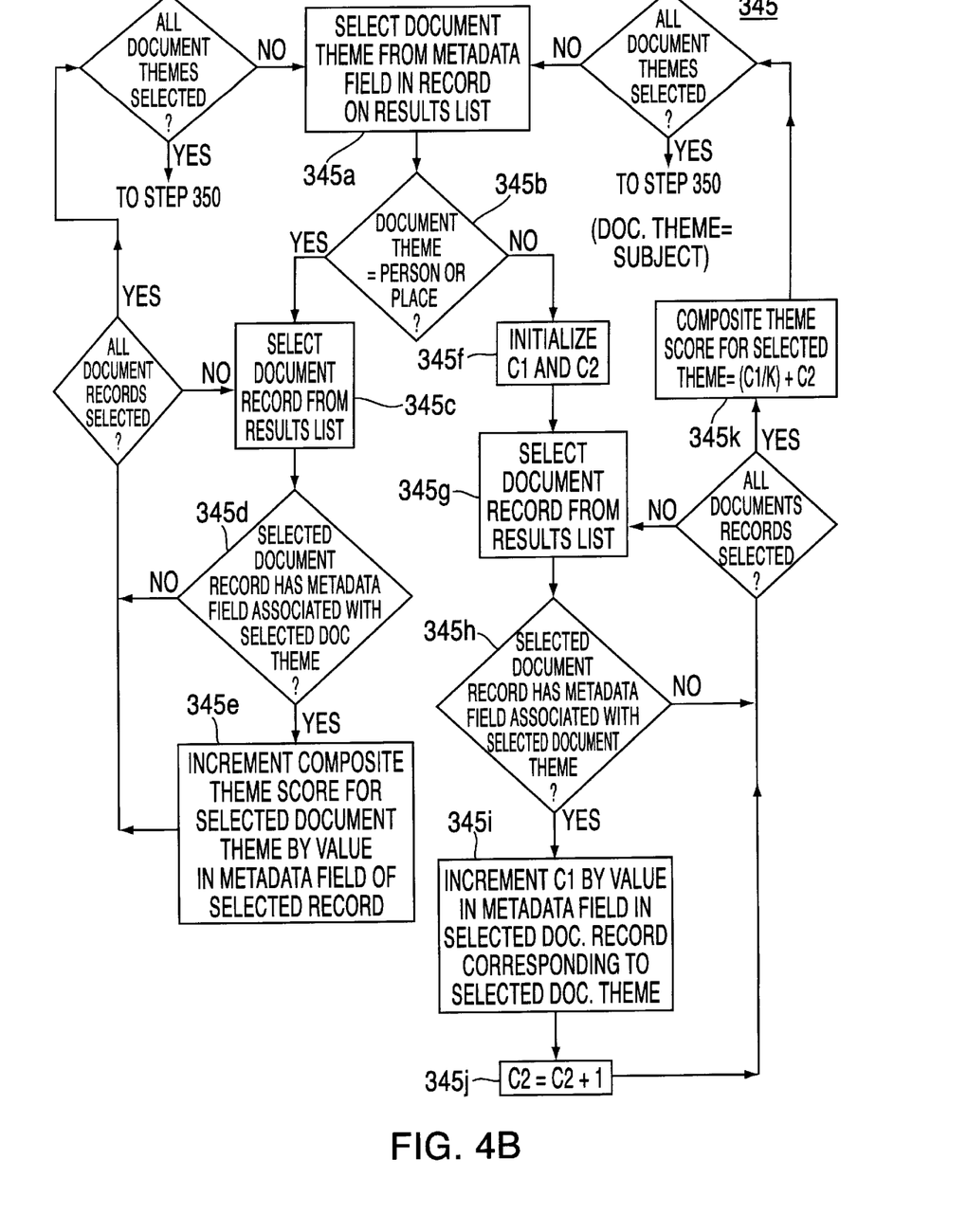
FIG. 4B is a process flow diagram illustrating a method for determining a plurality of composite theme scores associated with a user query, in accordance with a preferred embodiment of the present invention.

Referring now to FIG. 4B, there is shown a more detailed diagram illustrating the process used in the present invention for determining the composite theme scores associated with a user query. In step 345*a*, the metadata fields of the records in the search results list are examined in order to identify all of the document themes that are collectively represented by these metadata fields. For example, if the query provided by the user in step 320 was "Beatles" and there were three document records in the search results list, namely, a first document record with a metadata field that stored a confidence score for the subject "entertainment" and a further metadata field that stored a count for the location "London," a second document record with a metadata field that stored a count for the person "Paul McCartney," and a third document record with a metadata field that stored a count for the person "John Lennon" and a further metadata field that stored a count for the person "George Harrision," the following document themes would initially all be identified in step 345*a*: "Entertainment," "London," "Paul McCartney," "John Lennon" and "George Harrison." Thereafter, as shown in the remaining steps in FIG. 4B, each of these document themes is selected (one at a time) and a composite theme score is calculated corresponding to each such document theme.

Referring still to FIG. 4B, in step 345*b* a selected document theme (i.e., one of the document themes identified in step 345*a*) is examined to determine whether it corresponds to a person or place (such as "Paul McCartney" or "London") on the one hand, or a subject (such as "Entertainment") on the other hand. In addition, a composite theme score corresponding to the selected document theme is initialized to zero. If the selected document theme corresponds to a person or place, then processing proceeds to step 345c where a document record is selected from the document records on the search results list. In step 345d, the selected document record is examined in order to determine whether it contains a metadata field with a count corresponding to the selected document theme. If the selected document record has a metadata field with a count corresponding to the selected document theme, then in step 345e, the composite theme score corresponding to the selected document theme is incremented by the value in the metadata field in the selected document record that is associated with the selected document theme. Steps 345c, 345d and 345e are subsequently repeated until each document record in the search results list has been selected.

Referring still to FIG. 4B, if the selected document theme selected in step 345a corresponds to a subject (e.g., "Entertainment"), then processing proceeds to step 345f where first and second counters (C1 and C2, respectively) are initialized. Next, in step 345g, a document record is selected from the document records on the search results list. In step 345h, the selected document record is examined in order to determine whether it contains a metadata field with a confidence score corresponding to the selected document theme. If the selected document record has a metadata field with a confidence score corresponding to the selected document theme, then in step 345i, the first counter (C1) is incremented by the value in the metadata field in the selected document record that is associated with the selected document theme and in step 345j the second counter (C2) is incremented by 1. Steps 345g, 345h, 345i and 345j are subsequently repeated until each document record in the search results list has been selected. After each document record in the search results list has been selected, then in step 345k, the composite theme score corresponding to the selected document theme is calculated in accordance with equation (1) below:

$$\text{composite theme score for selected doc. theme} = (C1/K) + C2 \quad (1)$$

where K is a constant which, in a preferred embodiment is set to 1000.

Referring back now to FIG. 4A, following the determination of a composite theme score for each document theme represented by the metadata fields in the document records in the search results list, processing proceeds to step 350 where one or more "major" themes associated with the search query are determined. In step 350, each of the composite theme scores from step 345 is compared to a threshold, and each composite theme score that exceeds the threshold is identified as a major theme score. Thus, referring again to the example where the user query was "Beatles," if composite theme scores of 8, 2, 12, 4 and 15 were respectively determined in step 345 for the document themes "Entertainment," "London," "Paul McCartney," "John Lennon" and "George Harrison," and a threshold of 5 was used for the comparison in step 350, then the composite theme scores for "Entertainment," "Paul McCartney," "John Lennon" and "George Harrison" would each be deemed a "major" theme score. For purposes of the present invention, the document theme corresponding to a "major" theme score is considered a "major" theme.

In steps 355, 360 and 365, a ranked document list is prepared for each major theme identified in step 350. The ranked document list is prepared for each "person" on the major theme list, by selecting those document records on the search results list having metadata fields with counts corresponding to the given person, and then ordering the document records based on the magnitude of the counts. For example, the document record having a metadata field with the highest count corresponding to the given person will appear first on the ranked list corresponding to the given person and the document record having a metadata field with the lowest count corresponding to the given person will appear last on the ranked list. Similarly, a ranked document list is prepared for each "place" on the major theme list, by selecting those document records on the search results list having metadata fields with counts corresponding to the given place, and then ordering the document records based on the magnitude of the counts. For example, the document record having a metadata field with the highest count corresponding to the given place will appear first on the ranked list corresponding to the given place and the document record having a metadata field with the lowest count corresponding to the given place will appear last on the ranked list. Finally, a ranked document list is prepared for each "subject" on the major theme list, by selecting those document records on the search results list having metadata fields with confidence scores corresponding to the given subject, and then ordering the document records based on the magnitude of the confidence scores. For example, the document record having a metadata field with the highest confidence score corresponding to the given subject will appear first on the ranked list corresponding to the given subject and the document record having a metadata field with the lowest confidence score corresponding to the given subject will appear last on the ranked list.

Referring still to FIG. 4A, following the preparation of the ranked lists for each of the major themes, processing proceeds to step 370 where a list of the major themes is transmitted to user station 102 and displayed on the screen of the user station. Thus, referring again to the example where the user query was "Beatles," if "Entertainment," "Paul McCartney," "John Lennon" and "George Harrison" were each determined to be major themes of the search query, then a word or symbol corresponding to each of these major themes would be displayed to the user in the form of a theme list. The list of major themes is preferably presented to the user in a ranked order such that the major theme with the highest composite theme score appears first on the list, and the major theme having the lowest composite theme score appears last on the list. Finally, in steps 375 and 380, the user is given the option of "drilling down" to the document records associated with one of the listed major themes. In particular, in response to the selection by the user of one of the major themes on the user's display (for example, the user may make such a selection by clicking on one of the listed major themes on the user's display), document records containing bibliographic information (from database 118) representative of the ranked document list corresponding to the selected major theme are transmitted to user station 102 and displayed for the user. For each document record on the ranked document list, the bibliographical information retrieved and transmitted to the user includes, for example, the document title, author, publisher name, publication date, publication name and edition. A preferred data structure used for retrieving this bibliographical information from database 118 is discussed in connection with FIG. 5 of U.S. Pat. No. 5,717,914 entitled "Method for Categorizing Documents Into Subjects Using Relevance Normalization For Documents Retrieved From An Information Retrieval System In Response To A Query," the contents of which are hereby incorporated herein in their entirety by reference. Upon receipt of this bibliographical information, user PC 104 together with software 106 display the ranked document list (or a portion thereof), together with (i) the relevance scores (e.g., the count or confidence score) corresponding to each document record on the ranked document list (ii) bibliographical information corresponding to each document record on the ranked document list, and (iii) an indication whether the document record corresponds to a textual document or a multimedia file such as, for example, a file representing a still image. This information is displayed in a display window on PC 104 in relevance ranked order such that the document record(s) with a highest relevance score is/are displayed at the top of the list.

By clicking on one of the displayed bibliographical information associated with one of the document records on the displayed ranked document list, the user can retrieve the full text (or image) corresponding to a particular document record associated with the selected major theme. Following the selection of a document file by the user, PC 104 transmits a signal representative of the selected document file to session server 114 over channel 10. Upon receipt of this signal, session server retrieves from database 118 and transmits to PC 104 the text (if the selected document file corresponds to a textual document), image bitmap (if the selected document file corresponds to a still image), sequence of video frames (if the selected document file corresponds to a motion video sequence) or sequence of digital audio frames (if the selected document file corresponds to a digital audio sequence) associated with the selected document file. Upon of receipt of such text or multi-media information from session server 114, PC 104 together with software 106 display the text or multi-media information retrieved by session server 114 in a display window open on PC 104. The user may repeat this process to retrieve and display further text or multi-media information from other selected document files on PC 104.

Data Storage Formats

Figure 4C:
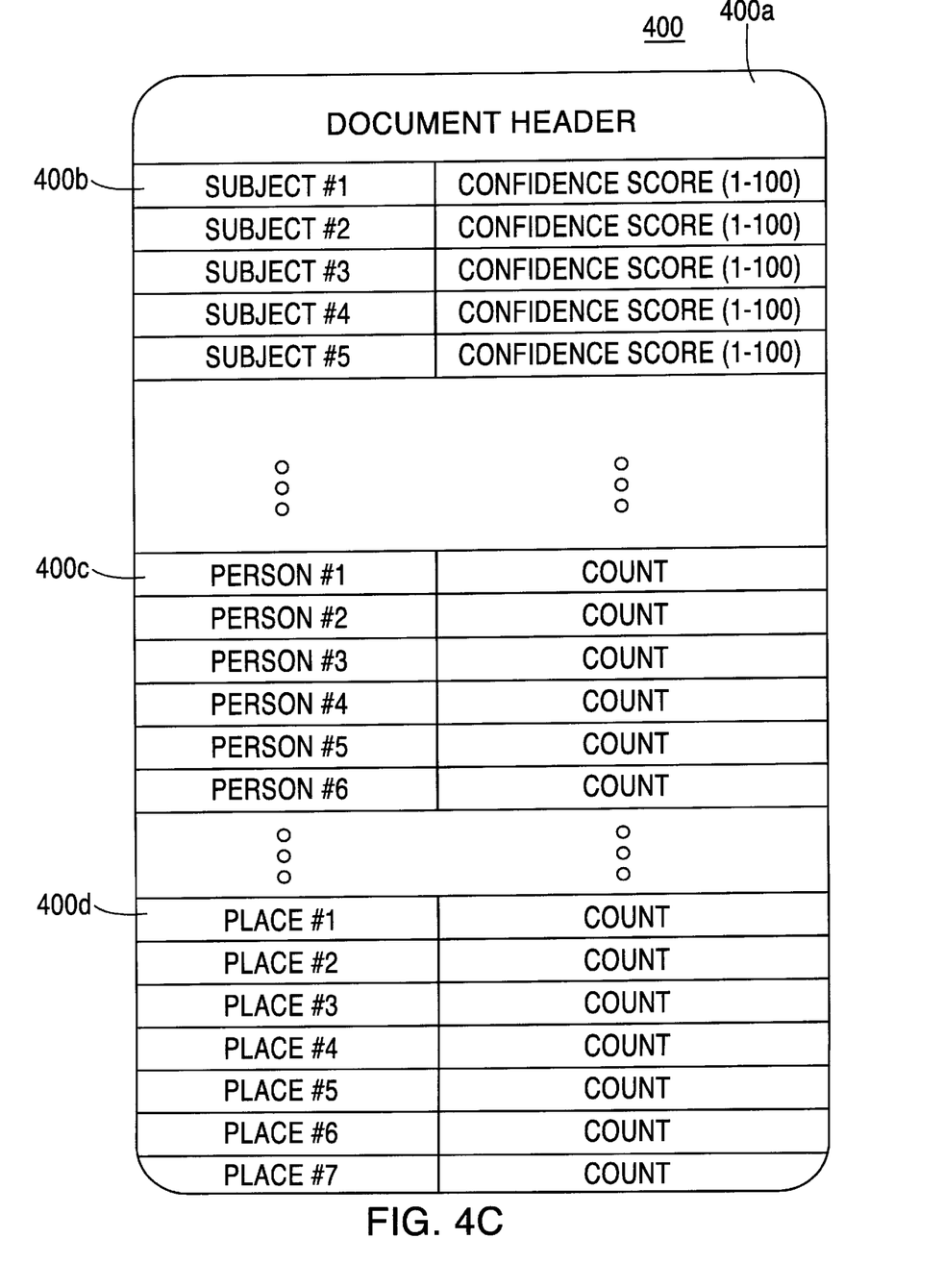
FIG. 4C is a diagram illustrating a preferred data structure of a document record for storing metadata associated with the document record, in accordance with a preferred embodiment of the present invention.

Referring now to FIGS. 4C and 5B, during operation of data center 110, session server 114 retrieves various document/image information from database 118. In the preferred embodiment of the present invention, a document information directory table is stored on database 118. For each textual document and multi-media file on database 118, the document information directory table includes an individual document record 400 (shown in FIG. 4C) formed of a header 400a and metadata fields 400b, 400c, and 400d. Header 400a is formed of approximately 25 separate information fields. The information fields in header 400a are described in detail in U.S. Pat. No. 5,717,914 entitled "Method for Categorizing, Documents Into Subjects Using Relevance Normalization For Documents Retrieved From An Information Retrieval System In Response To A Query," incorporated herein by reference. Record 400 further includes metadata fields 400b for storing a numerical score (i.e., a confidence score) representing a degree of correlation between the stored document associated with the document record and a particular subject. The higher the confidence score, the stronger the correlation between the subject associated with the confidence score and the document. In a preferred embodiment of the present invention, the possible subjects to which a given document may correlate include, for example, sports, politics, literature, entertainment, etc. An automated system for identifying one or more subjects that are associated with a document and for assigning confidence scores to each such subject is disclosed in U.S. Pat. No. 5,717,914 entitled "Method for Categorizing Documents Into Subjects Using Relevance Normalization For Documents Retrieved From An Information Retrieval System In Response To A Query," incorporated herein by reference. Record 400 further includes metadata fields 400c for storing numerical scores (i.e., counts), each one of which represents the number of times a given person is mentioned in the document associated with the given document record. Finally, record 400 further includes metadata fields 400d for storing numerical scores (i.e., counts), each one of which represents the number of times a given place is mentioned in the document associated with the given document record. Thus, the more often a given person or place is mentioned in a document, the higher the "count" associated with that person or place will appear in the metadata field associated with that person or place.

Figure 5A:
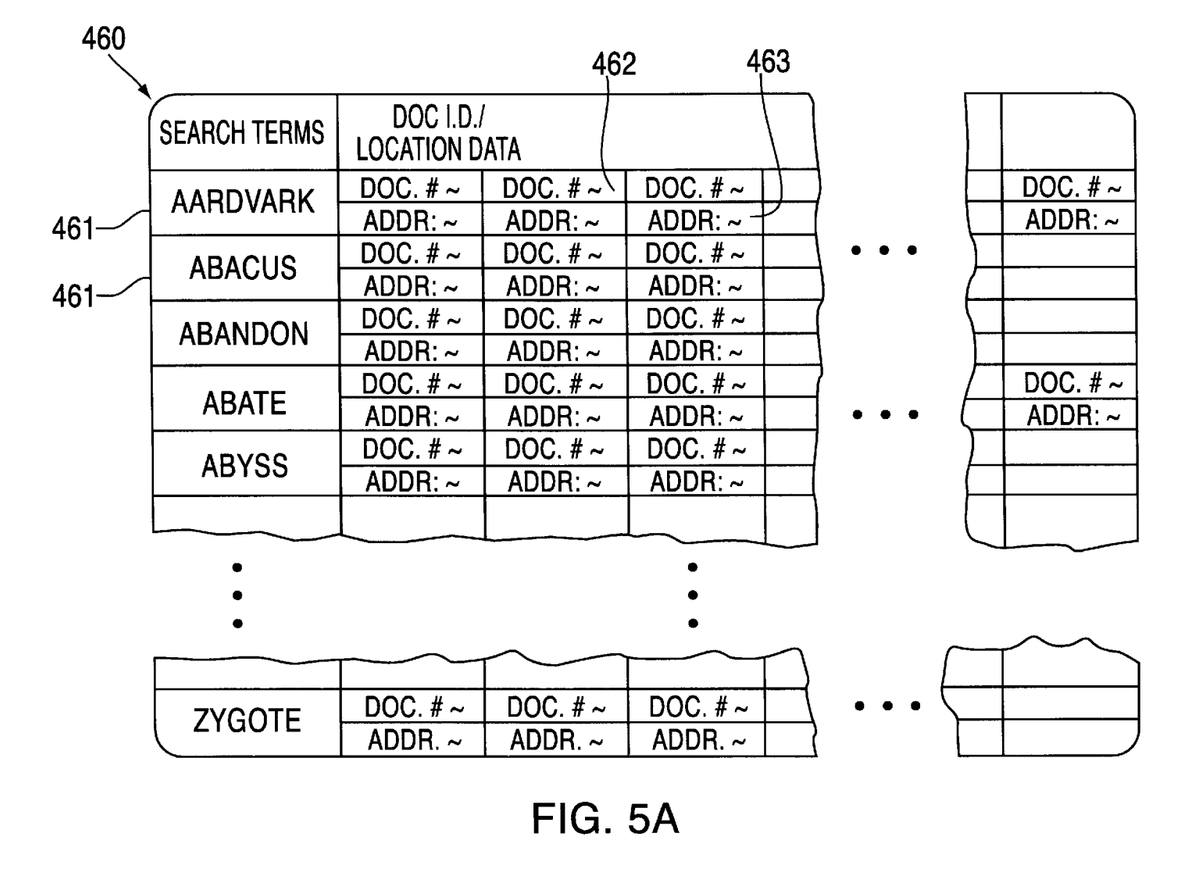
FIG. 5A is a diagram illustrating a preferred data structure for implementing a document index database, in accordance with a preferred embodiment of the present invention.
Figure 5B:
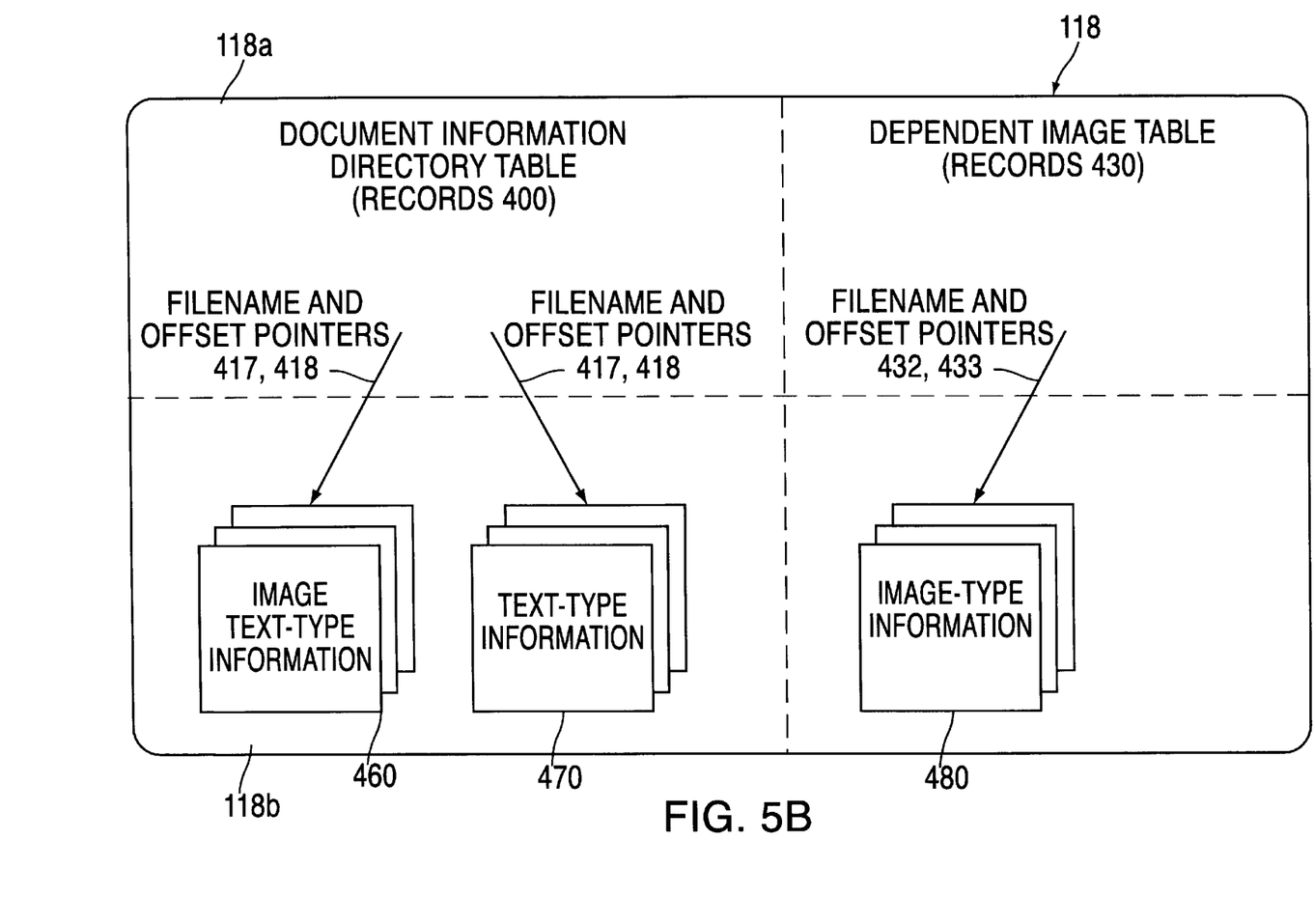
FIG. 5B is a diagram illustrating a preferred data storage format for implementing an image/text database, in accordance with a preferred embodiment of the present invention.

Referring now to FIG. 5A, there is shown a diagram illustrating a preferred data structure 460 for implementing document index database 117, in accordance with a preferred embodiment of the present invention. Data structure 460 contains a list of search terms 461 corresponding to potential search terms which may appear in a search query. For each search term 461 listed in data structure 460, data structure 460 stores a document identification number 462 representing each document file (stored in database 118) that includes that search term, along with location information 463 corresponding to the location(s) of the search term in each such document file. Further details concerning data structure 460 are described in U.S. Pat. No. 5,717,914 entitled "Method for Categorizing Documents Into Subjects Using Relevance Normalization For Documents Retrieved From An Information Retrieval System In Response To A Query," incorporated herein by reference.

Session/Query Server Architecture

Referring now to FIG. 6, there is shown a block diagram illustrating the operation of a session server software system 114a and a query server software system 116a for respectively implementing the session and query servers 114, 116, in accordance with a preferred embodiment of the present invention. Although the operation of data center 110 as described above involves only a single user station 102 and a single user session 300, in the preferred embodiment of the present invention session and query servers 114, 116 in data center 110 are adapted to simultaneously receive and process different search queries from multiple user stations 102. In accordance with this multi-user aspect of data center 110, session server software 114a includes a plurality of session managers 130, each of which is responsible for monitoring and directing a single active user session 300 corresponding to an individual user station 102. For each active user session 300, the corresponding session manager (i) sends queries received from the user station 102 to a query engine interface 134, (ii) retrieves a search results list (described above) from the query engine interface 134, (iii) identifies one or more major themes associated with the query from the search results list; (iv) forms a ranked document list corresponding to each major theme; (v) transmits a list of major themes to the user; (vi) receives information representing a selected major theme from the user station; (vii) retrieves bibliographical information corresponding to the documents in the search results list associated with the selected major theme from database 118a and transmits such information to user station 102, and (viii) retrieves (using document retrieval system 136) text and multi-media files identified by user station 102 from database 118b and transmits such files to user station 102. An active session manager component 132 is coupled to the session managers 130, and maintains a list of all active user sessions 300 by tracking the user identification number corresponding to each user station 102 engaged in an active session 300.

The document retrieval system 136 accessed by session managers 130 includes separate retrieval systems (not shown) for retrieving text and multi-media files (such as images) from database 118b. For each document file stored in database 118, records 400 (and 430, if applicable) corresponding to the document file and representing information such as, for example, a document identification number, bibliographical data and publisher data are stored in database 118a together with one or more pointers (417, 418, 432, 433—shown in FIG. 5B) corresponding to the location of the full text/image corresponding to the document file in database 118b. During retrieval of a textual document or multi-media file from database 118, document retrieval system 136 initially retrieves pointer information corresponding to the full text/image of the file from the Document Information Directory Table and Dependent Image Table on database 118a, based on the document identification number of the document file to be retrieved. Based on this pointer information, document retrieval system 136 then retrieves the full text/image corresponding to the file from database 118b. Details of the Document Information Directory Table and Dependent Image Table on database 118a are disclosed in U.S. Pat. No. 5,717,914 entitled "Method for Categorizing Documents Into Subjects Using Relevance Normalization For Documents Retrieved From An Information Retrieval System In Response To A Query," incorporated herein by reference.

Query server software 116a includes a plurality of search engines 142, each of which is responsible for (i) executing a search query passed to the search engine 142 by session server 114a, and (ii) returning a search results list corresponding the query to session server 114a. The search engines 142 are each coupled to document index database 117, and schedulers 144 monitor and queue the searches performed by search engines 142 on document index database 117. Parameters representing search queries and search results are transmitted between a search engine 142 and session server 114a using a search engine application program interface (API) 140.

Operation of Session Manager

Figure 6A:
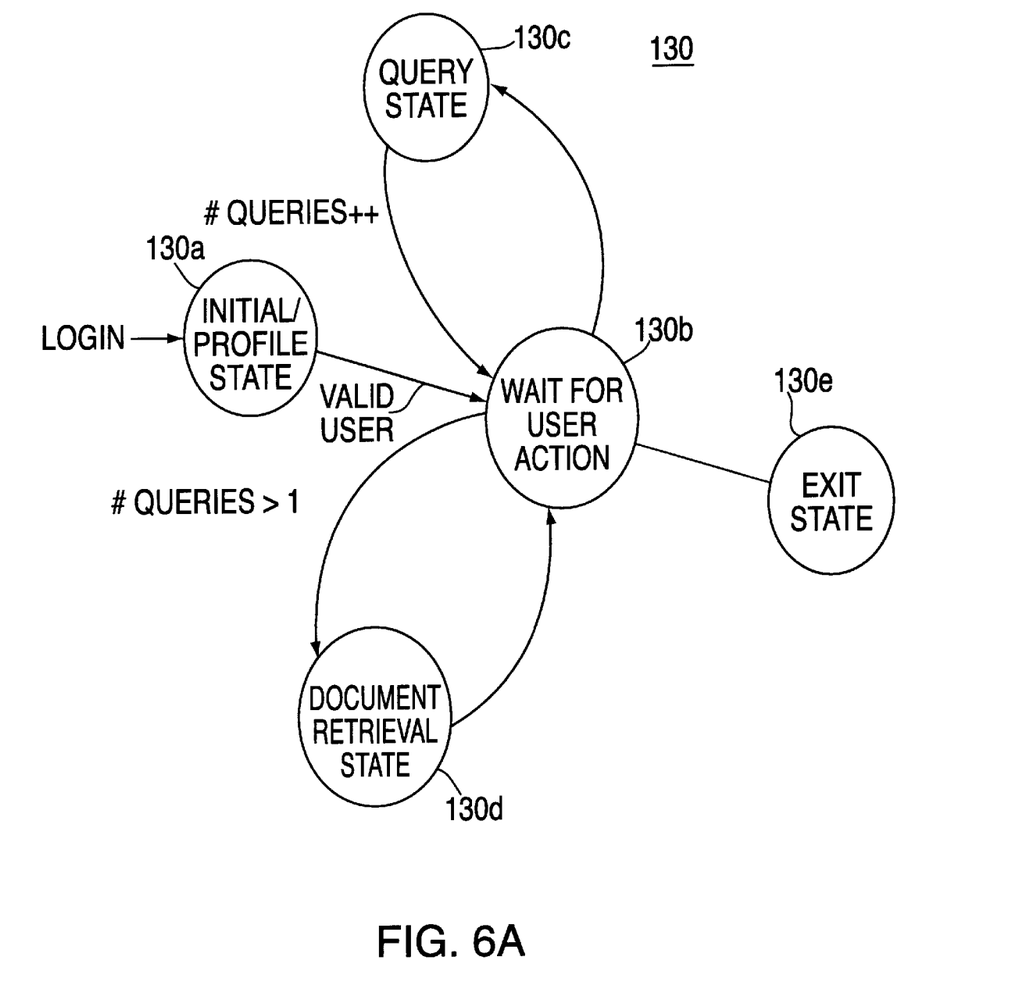
FIG. 6A is a state flow diagram showing the operation of a session manager software system, in accordance with a preferred embodiment of the present invention.

Referring now to FIG. 6A, there is shown a state flow diagram illustrating the operation of session manager software system 130, in accordance with a preferred embodiment of the present invention. Session manager software system 130 maintains the state of each ongoing user session in system 100. Entry into session manager software system 130 begins with initial/profile state 130a, which is invoked when a user login request is passed to data center 110 through communications channel 108. In the initial/profile state 130a, session manager software system 130 functions with enrollment means 120 and authentication means 122 to verify user authenticity and/or enroll new users into data center 110. The tasks performed by enrollment means 120 and authentication means 122 in state 130a correspond substantially to the enrollment and authentication functions described above in connection with steps 310 and 315 of user session 300. Once session manager software 130 authenticates a user and verifies that there are no other user sessions corresponding to the user's identification number which are active on data center 110, session manager software system 130 enters a wait for user action state 130b, which waits for a user station 102 to request services from session manager 130. As each user request is received, session manager software system 130 transitions the session server 114 into an appropriate state, and then returns back to the wait for user action state 130b after the request has been serviced. In the preferred embodiment, entry into the document retrieval state 130d may occur only after query server 116 has processed a search query for the user station 102, and returned a valid search results list for the search query to session server 114.

When the wait for user query state 130b is initially entered following a transition from initial/profile state 130a, the only valid transition out of the wait for user query state 130b is to query state 130c. The query state 130c is responsible for collecting search parameters input to the user station 102, sending the search parameters to the query server 116, retrieving a search results list form the query server 116, and then passing search results back to the session server. In the preferred embodiment, the search parameters collected from the user station 102 and forwarded to query server 116 include, at a minimum, a query string representing a natural language query entered by the user. Upon successful completion of the search, the query state 130c is responsible for receiving a search result list from the query engine 116, and then passing bibliographical information and metadata information corresponding to each document record in the search result list to the session server. The query state then analyzes the metadata information (as described above) in order to identify the major themes associated with the query and form ranked lists of the document records associated with each major theme (as described above). Upon completion of the above tasks, query state 130c returns control to the wait for user action state 130b.

In the event the user of user station 102 selects a document for retrieval, session manager software 130 enters document retrieval state 130d. In this state, session server 114 receives a signal from user station 102 representing a particular document that the user wishes to retrieve. State 130d is responsible for retrieving (using retrieval system 136) the full text, digital video or digital audio information corresponding to the selected document from database 118, and passing then transmitting this document information back to user station 102. Once the appropriate document information is passed to user station 102, control is passed back to the wait for user action state 130b.

When the user of user station 102 desires to terminate a user session, session manager software 130 enters an exit state 130e, wherein session manager software 130 causes the active session manager component 132 to remove the user identification number corresponding to the user of user station 102 from the list of active user sessions.

Furthermore, it is to be understood that although the present invention has been described with reference to a preferred embodiment, various modifications, known to those skilled in the art, may be made to the structures and process steps presented herein without departing from the invention as recited in the several claims appended hereto.

What is claimed is:

1. A method of identifying at least one query theme associated with a search query, wherein the query theme corresponds to a subject, person or place associated with the search query, comprising the steps of:

(A) providing a document record archive having a plurality of document records each of which is associated with a stored document, each of the document records having a plurality of metadata fields each of which stores a numerical score representing a degree of correlation between the stored document associated with the document record and a document theme, and wherein the document theme corresponds to a subject, person or place associated with the stored document;

(B) retrieving, in response to the search query, a results list formed of ones of the document records, each of the document records in the results list being associated with the search query;

(C) determining a plurality of composite theme scores by calculating a composite theme score for each document theme represented by the metadata fields in the document records in the results list;

(D) comparing each of the plurality of composite theme scores to a threshold;

(E) identifying as a major theme score each composite theme score that exceeds the threshold;

(F) selecting the document theme associated with the major theme score as the query theme associated with the search query.

2. The method of claim 1, wherein step (E) comprises identifying a plurality of major theme scores, wherein each of the plurality of major theme scores corresponds to a composite theme score that exceeds the threshold, and step (F) comprises selecting a plurality of document themes each of which is associated with one of the major theme scores as query themes associated with the search query.

3. The method of claim 2, further comprising the step of ranking the query themes based upon the major theme score associated with each of the query themes.

4. The method of claim 2, further comprising:

(G) selecting a query theme associated with the search query;

(H) selecting document records from the results list having metadata fields associated with the selected query theme; and (I) ranking the selected document records based on values associated with the selected query theme stored in the metadata fields of the selected document records.

5. The method of claim 4, further comprising the step of repeating steps (G)–(I) for each of the query themes associated with the search query.

6. The method of claim 2, displaying a symbol representing each of the query themes associated with the search query on a computer screen.

7. The method of claim 6, further comprising the step of displaying document records associated with a selected query theme in response to a selection by a user of a symbol on the computer screen associated the selected query theme.

8. The method of claim 1, wherein step (C) further comprises the steps of:

(i) selecting a document theme represented by one of the metadata field in the document records in the search results list;

(ii) if the selected document theme corresponds to a person or place, then
  (a) selecting a document record from the results list;
  (b) if the selected document record has a metadata field associated with the selected document theme, then selecting the numerical score stored in the metadata field associated with the selected document theme in the selected document record;
  (c) selecting a plurality of numerical scores by repeating steps (a)–(b) for each document record in the results list; and
  (d) calculating the composite theme score associated with the selected document theme by summing the numerical scores selected in step (c).

9. The method of claim 8, wherein step (C) further comprises the steps of:

(iii) if the selected document theme corresponds to a subect, then
  (a) initializing a first counter (C1) and a second counter (C2);
  (b) selecting a document record from the results list;
  (c) if the selected document record has a metadata field associated with the selected document theme, then (i) selecting the numerical score stored in the metadata field associated with the selected document theme in the selected document record, (ii) incrementing the first counter (C1) by the numerical score selected in step (c)(i), and (iii) incrementing the second counter (C2) by unity;
  (d) repeating steps (b)–(c) for each document record in the results list; and
  (e) calculating the composite theme score associated with the selected document theme in accordance with the equation below:

composite theme score=$(C1/K)+C2$ where K is a predetermined constant.

10. The method of claim 9, wherein step (C) further comprises the step of:

(iv) repeating steps (C)(i)–(C)(iii) for each document theme represented by the metadata fields in the document records in the results list.

* * * * *